Sept. 5, 1950     A. H. BERRA ET AL     2,521,330
SLED RUNNER ATTACHMENT FOR BABY BUGGIES Filed Sept. 16, 1947     2 Sheets-Sheet 1

*Inventor*
Albert H. Berra
Alois A. Claus

*By* Clarence A. O'Brien
and Harvey B. Jacobson
*Attorneys*

Sept. 5, 1950   A. H. BERRA ET AL   2,521,330
SLED RUNNER ATTACHMENT FOR BABY BUGGIES
Filed Sept. 16, 1947   2 Sheets-Sheet 2

Inventor
Albert H. Berra
Alois A. Claus

By Clarence A. O'Brien
and Harvey B. Jacobson
Attorneys

Patented Sept. 5, 1950

2,521,330

UNITED STATES PATENT OFFICE 2,521,330

SLED RUNNER ATTACHMENT FOR BABY BUGGIES

Albert H. Berra and Alois A. Claus, Eveleth, Minn.

Application September 16, 1947, Serial No. 774,302

1 Claim. (Cl. 280—11)

This invention relates to improvements in sled runner attachments for baby buggies.

An object of the invention is to provide an improved sled runner attachment for a baby buggy.

Another object of the invention is to provide an improved sled runner attachment for baby buggies which will be collapsible when the wheels of the baby buggy are to engage the ground, and will be extensible to elevate the wheels above the ground when the runners are to contact the ground in the event that it is covered with snow.

A further object of the invention is to provide an improved sled runner attachment for baby buggies including a substantially rectangular frame adapted to be clamped to the front and rear axles of a baby buggy, with depending longitudinally extending sled runners linked thereto for movement toward and away from said frame, and a pivoted actuating yoke mounted upon the rear links formed with latches on the forward ends thereof adapted to be selectively engaged and locked in position in adjusting notches in the rear upper edges of said side frame members 1 and 2.

A still further object of the invention is to provide an improved sled runner attachment for baby buggies which will be highly efficient in operation, and relatively inexpensive to manufacture and produce.

Other objects will appear as the description proceeds.

In the accompanying drawings which form a part of this application,

Like characters of reference are used throughout the following specification and the accompanying drawings to designate corresponding parts.

Figure 1:
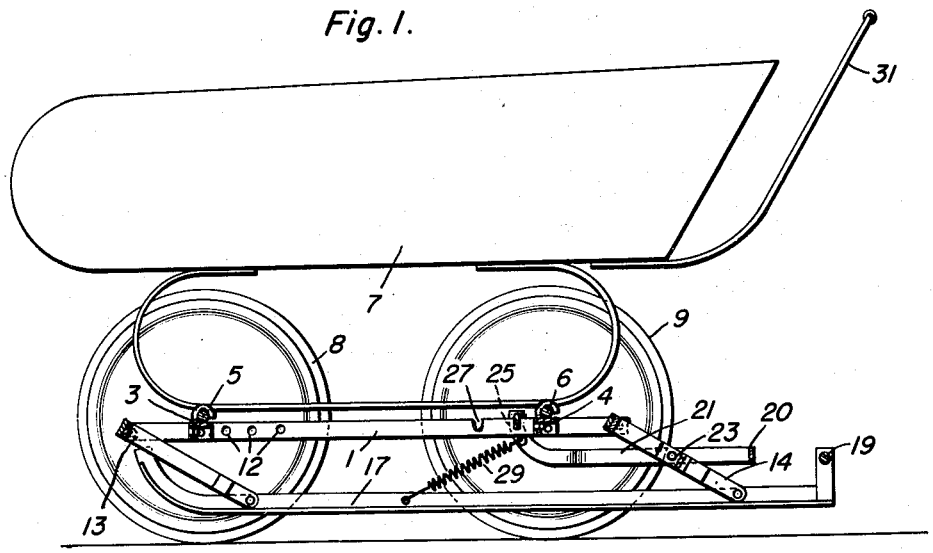
Figure 1 is a partial longitudinal vertical sectional view through the device with parts thereof being in section and parts being in elevation showing the sled runners spaced above the ground and the wheels of a baby buggy engaging the ground.
Figure 2:
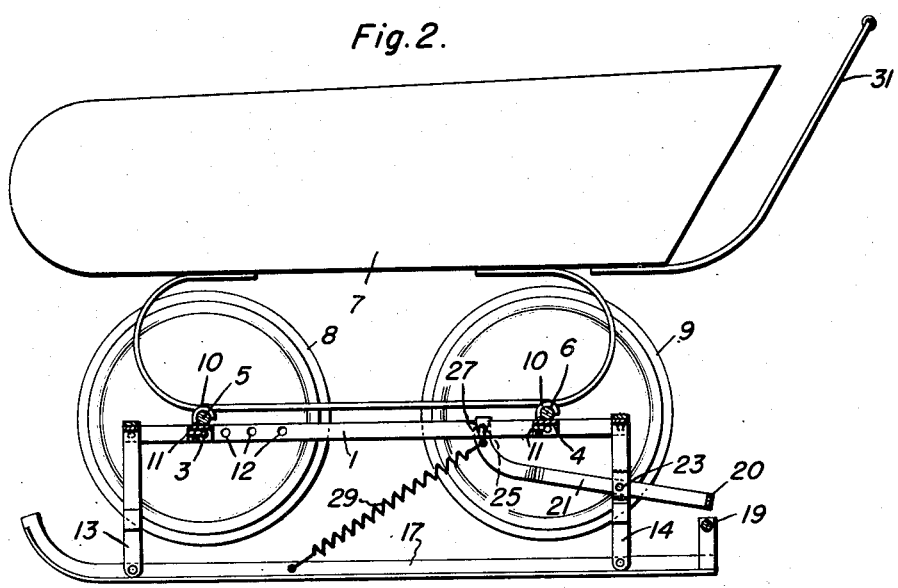
Figure 2 is a partial longitudinal vertical sectional view through the device with parts thereof shown in section and other parts shown in elevation, showing the wheels of a baby buggy elevated above the ground, and the sled runners in contact with and in engagement with the ground.
Figure 5:
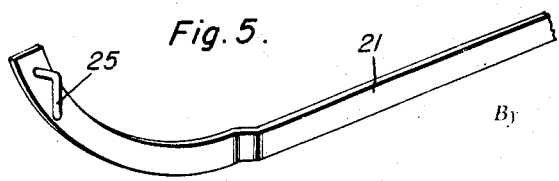
Figure 5 is a perspective view of one end of the operating yoke arms showing a latch finger mounted upon the end thereof.
Figure 3:
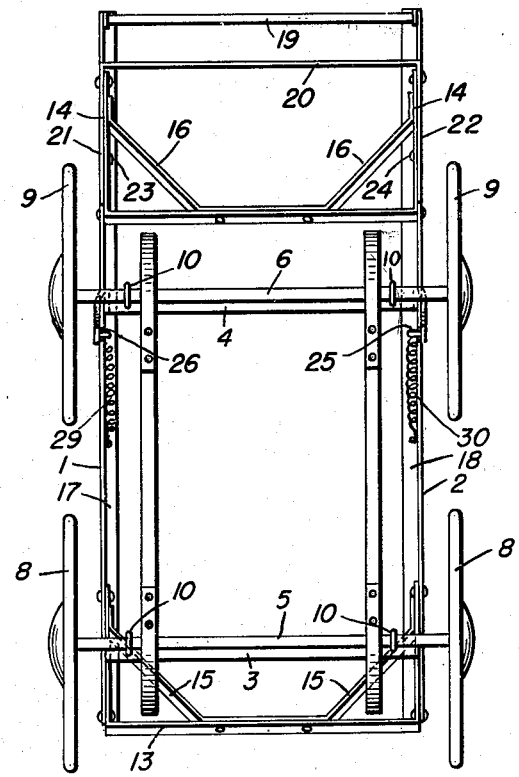
Figure 3 is a plan view of the sled runner attachment showing the same attached to front and rear wheel supported axles.
Figure 4:
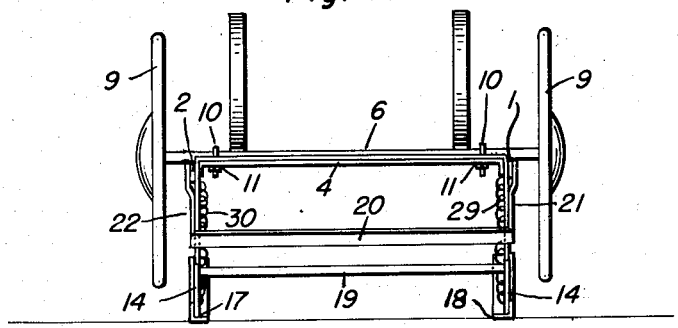
Figure 4 is a rear elevation of the runner attachment showing the runners engaging the ground and the wheels supported in elevated position.

In carrying out the invention, there is provided an improved sled runner attachment for baby buggies comprising a substantially rectangular shaped supporting frame including transversely spaced longitudinally extending side frame members 1 and 2, and a pair of inverted U-shaped cross frame members 3 and 4 connected between said side frame members inwardly of their opposite ends.

The front and rear axles 5 and 6 of a baby buggy 7 support the front and rear wheels 8 and 9, respectively, of said buggy, and said axles are placed in position to overlie the cross frame members 3 and 4 and to be secured thereto by means of the hooked fasteners 10 extending about said axles and through the cross frame members 3 and 4. The lower ends of the fasteners 10 are threaded to receive the securing nuts 11 for holding the same in clamped or secured position about said axles 5 and 6.

A plurality of spaced openings 12 will be formed through the side frame members 1 and 2 adjacent their front ends for varying the position of the front cross frame member 3 for accommodating the device to baby buggies having different frame sizes or wheel bases.

The inverted U-shaped supporting link members 13 and 14 are pivotally connected to the front and rear ends of the side frame members 1 and 2, and are formed with the diagonal braces 15 and 16 welded or otherwise secured between the sides and base portions of said supporting link members.

A pair of longitudinally extending angle iron sled runners 17 and 18 are bent upwardly slightly at their front ends, and are attached to the depending lower ends of the supporting link members. The rear ends of the runners 17 and 18 are bent upwardly at right angles, and are connected together by means of the cross member or bar 19.

A U-shaped actuating yoke 20 is provided with side arms 21 and 22 pivotally supported upon the rear depending supporting link members 14, at 23 and 24, and the forward and upper ends of said side arms 21 and 22 are formed arcuate in shape extending upwardly and outwardly of said side frame members 1 and 2. Inwardly and downwardly extending latch pins 25 and 26 are fixed to the extreme forward ends of the side yoke arms 21 and 22, and are adapted to be received or seated in the notch 27 formed in the upper rear edges of said side frame members 1 and 2 when said attachment and frame is in extended position and the baby buggy wheels 8 and 9 are in contact with the ground.

Coil springs 29 and 30 will be connected at their forward, lower ends to the sled runners 17 and 18, and have their rear upper ends attached to the arcuate portions of the yoke arms 21 and 22 for resiliently holding the latch pins 25 and 26 in the notches 27 and 28.

Assuming that the sled runners 17 and 18 are in contact with the ground, and the wheels 8 and 9 are elevated above the ground. If a bare spot on the ground is encountered, pressure will be applied upon the actuating yoke 20 within convenient reach of the foot of the operator, causing the runners to swing upwardly, allowing the wheels 8 and 9 to engage the ground. When it becomes necessary to use the runners 17 and 18, a foot is braced against the rear runner connecting bar 19 and the buggy 7 is pulled back by the handle 31 until the latch pins 25 upon the yoke arms 21 and 22 lock in the notches 27 in the side frame members 1 and 2.

From the foregoing description, it will be apparent that there has been devised and provided a highly efficient form of sled runner attachment for baby buggies.

While the preferred embodiment of the instant invention has been illustrated and described, it will be understood that it is not intended to limit the scope of the invention thereto, as many minor changes in detail of construction may be resorted to without departure from the spirit of the invention.

Having described the invention, what is claimed as new is:

A sled attachment for a wheeled vehicle having front and rear axles comprising a frame, brace bars on said frame, fastening means adjustably carried by said bars for securing the frame to the axles, a front and rear pair of vertical supporting members pivotally carried by said brace bars, runners pivotally secured to the lower ends of said supporting members, locking bars pivotally secured to the rear pair supporting members, angular locking pins disposed on the inner surfaces of one of each of the ends of the locking bars and slidably disposed on the upper edges of the brace bars, locking recesses formed in the upper edges of said brace bars for accommodating said pins to lock the runners in a raised and lowered position, means for releasing said pins from the recesses including a transverse foot bar disposed between the locking bars, resilient means connected between said locking bars and the runners for normally urging said runners upwardly and a transverse foot bar disposed between the runners for moving the same downwardly and moving the frame portion carrying the recesses into engagement with the locking pins.

ALBERT H. BERRA.
ALOIS A. CLAUS.

REFERENCES CITED

The following references are of record in the file of this patent:

UNITED STATES PATENTS

| Number | Name | Date |
|---|---|---|
| 1,004,722 | Baldwin | Oct. 3, 1911 |
| 1,027,224 | Syverson | May 21, 1912 |
| 1,094,420 | Bergren | Apr. 28, 1914 |
| 1,438,359 | Caron et al. | Dec. 12, 1922 |
| 1,974,163 | Sentner et al. | Sept. 18, 1934 |